United States Patent [19]

Rische et al.

[11] Patent Number: 4,731,535

[45] Date of Patent: Mar. 15, 1988

[54] APPARATUS FOR CHECKING PERSONS FOR RADIOACTIVE CONTAMINATION

[75] Inventors: Uwe W. Rische, Bendestorf; Rainer Gerlach, Wedel, both of Fed. Rep. of Germany

[73] Assignee: Firma Herfurth GmbH, Hamburg, Fed. Rep. of Germany

[21] Appl. No.: 828,054

[22] Filed: Feb. 10, 1986

[30] Foreign Application Priority Data

Feb. 18, 1985 [DE] Fed. Rep. of Germany ....... 3505527
Jun. 22, 1985 [EP] European Pat. Off. ......... 851077461

[51] Int. Cl.$^4$ .............................................. G01J 1/42
[52] U.S. Cl. .................................. 250/394; 250/370
[58] Field of Search ................. 250/394, 358.1, 370 A

[56] References Cited

U.S. PATENT DOCUMENTS 4,352,019  9/1982  Pollard ............................... 250/394

FOREIGN PATENT DOCUMENTS 0060574  9/1982  European Pat. Off. ............ 250/394
1265878  4/1968  Fed. Rep. of Germany .
2413027  9/1975  Fed. Rep. of Germany ...... 250/394
7515406  9/1975  Fed. Rep. of Germany .
2311319  12/1976  France ................................. 250/394

OTHER PUBLICATIONS

Atompraxis—1969, pp. 338–344.
IPM7 Microprocessor Controlled Personnel Contamination Monitor (pp. 1 through 8) Sep.-1982.

Primary Examiner—Carolyn E. Fields
Assistant Examiner—Richard Hanig
Attorney, Agent, or Firm—Toren, McGeady & Associates

[57] ABSTRACT

The apparatus for checking persons for radioactive contamination comprises two detector panels (1, 2), each of which is provided on one broadside with detectors. The two detector panels (1, 2) extend at an angle to each other and said angle has an apex which defines a vertical axis. Those broadsides of the detector panels which are provided with detectors face the space included by the detector panels. Adjacent detectors of each detector panel are separated from each other by a vertical blank strip, which is so arranged relative to the contour of a reference figure (6) in a top plan view that the signals generated by the detector means which are separated by the blank strip (9, 10) can be processed to compensate the influence of the closest approximation of the reference figure to the detector panel on the generation of said signals. Adjacent detector means on each side of the vertical blank strip may be separated by a horizontal blank strip. The apparatus may be provided with underarm boxes.

13 Claims, 15 Drawing Figures

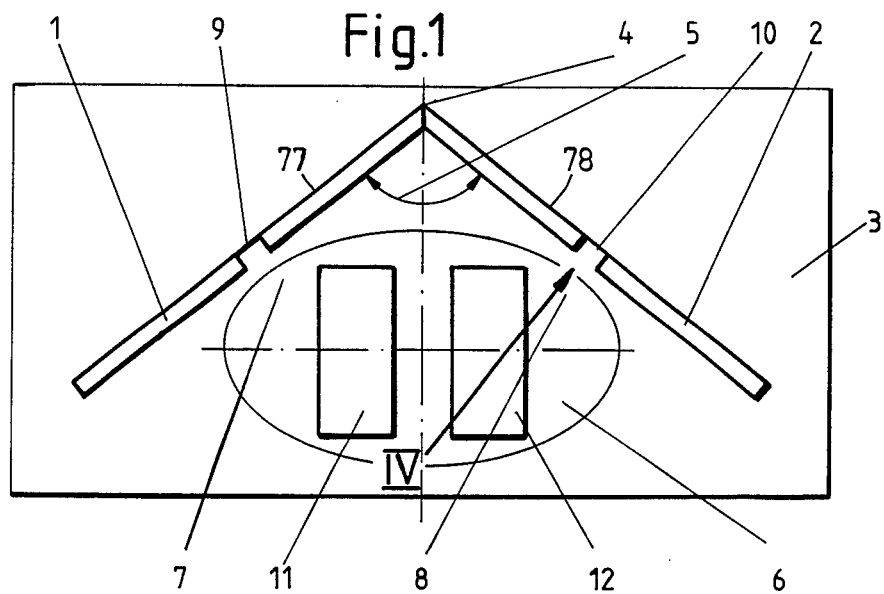
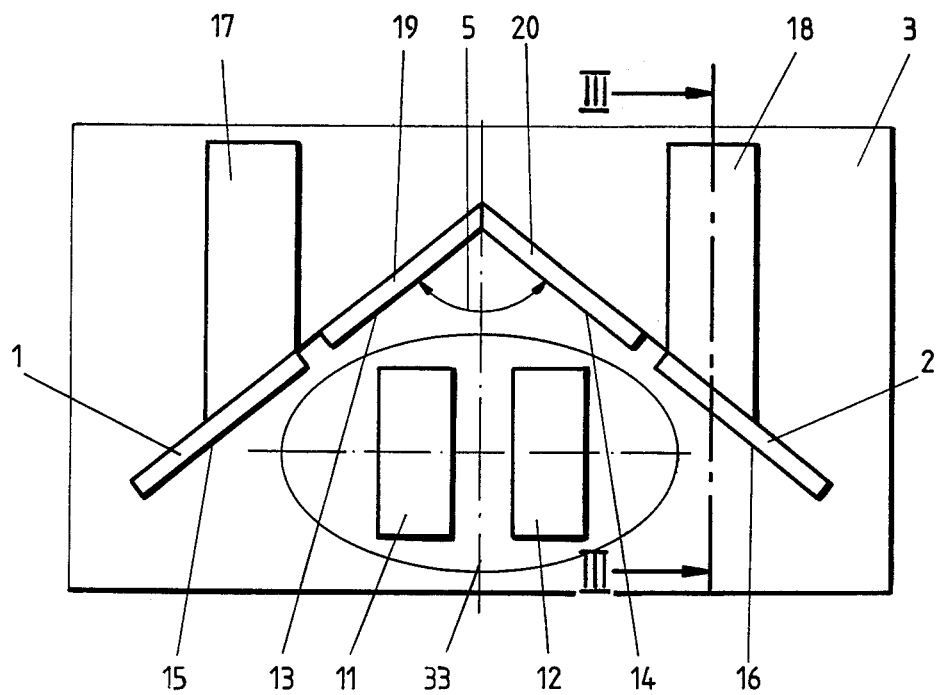

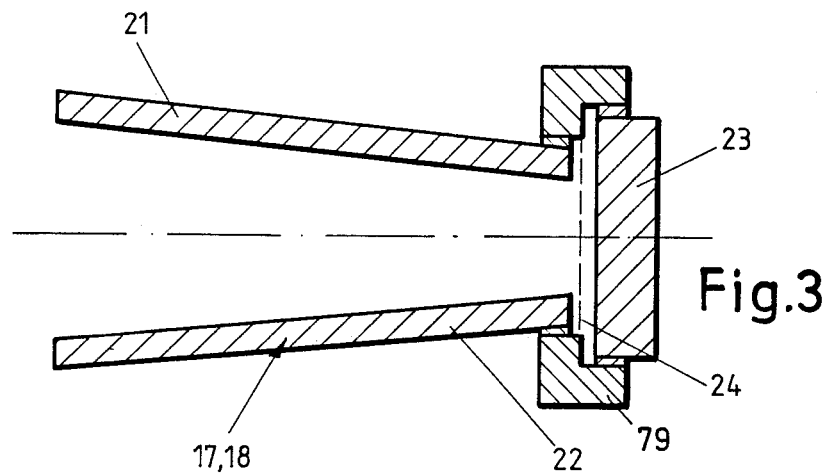
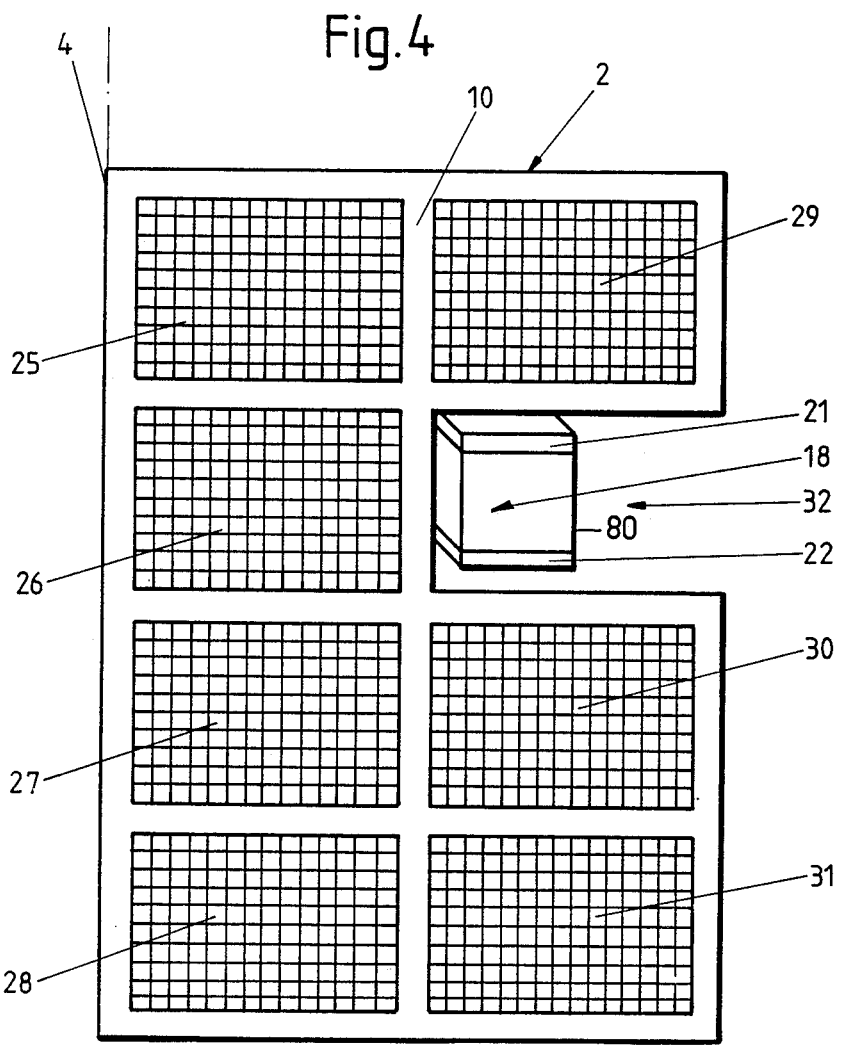

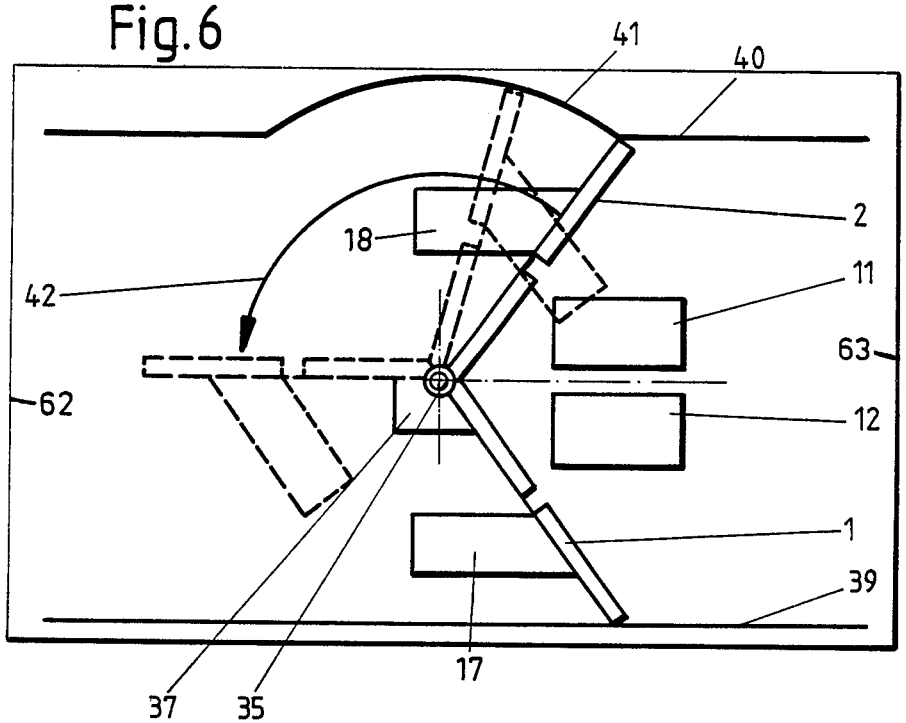
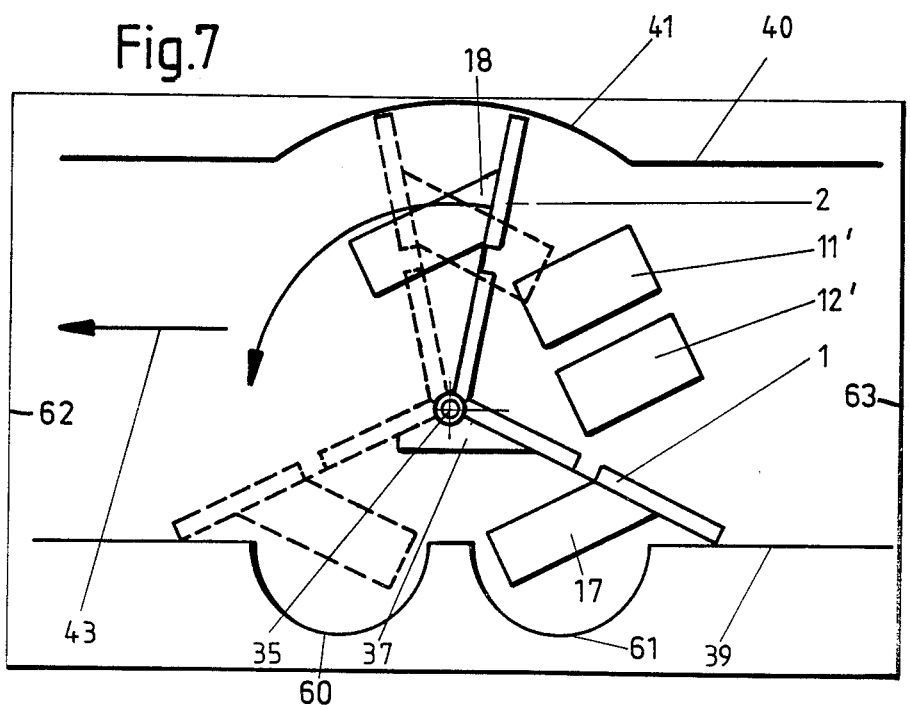

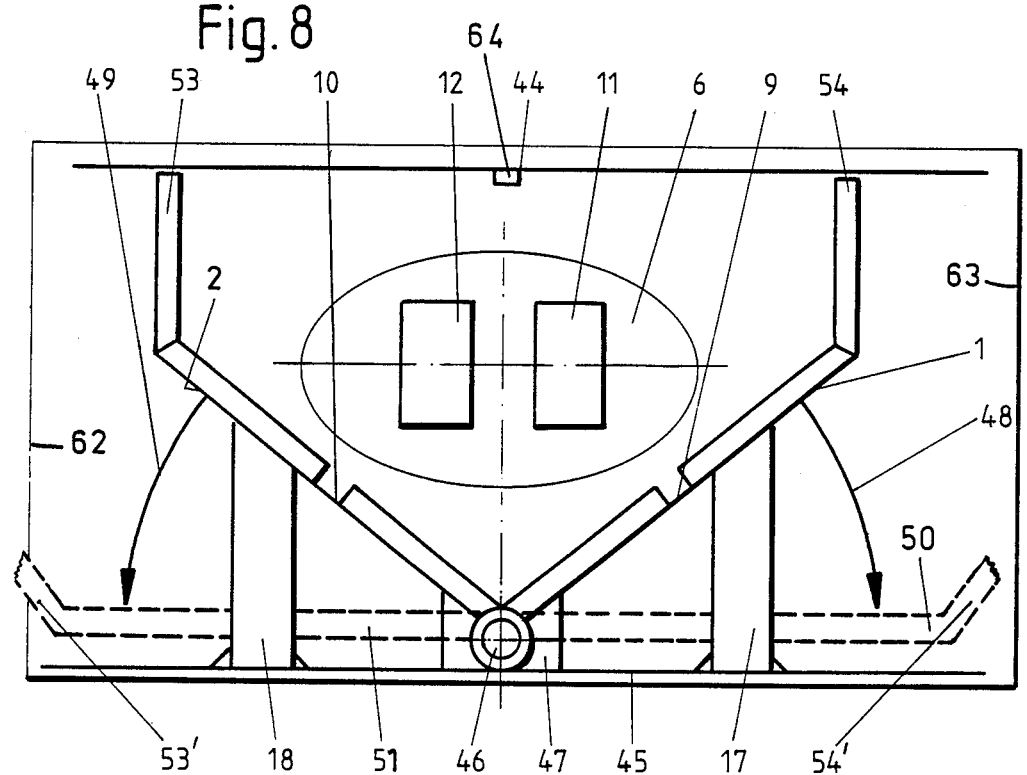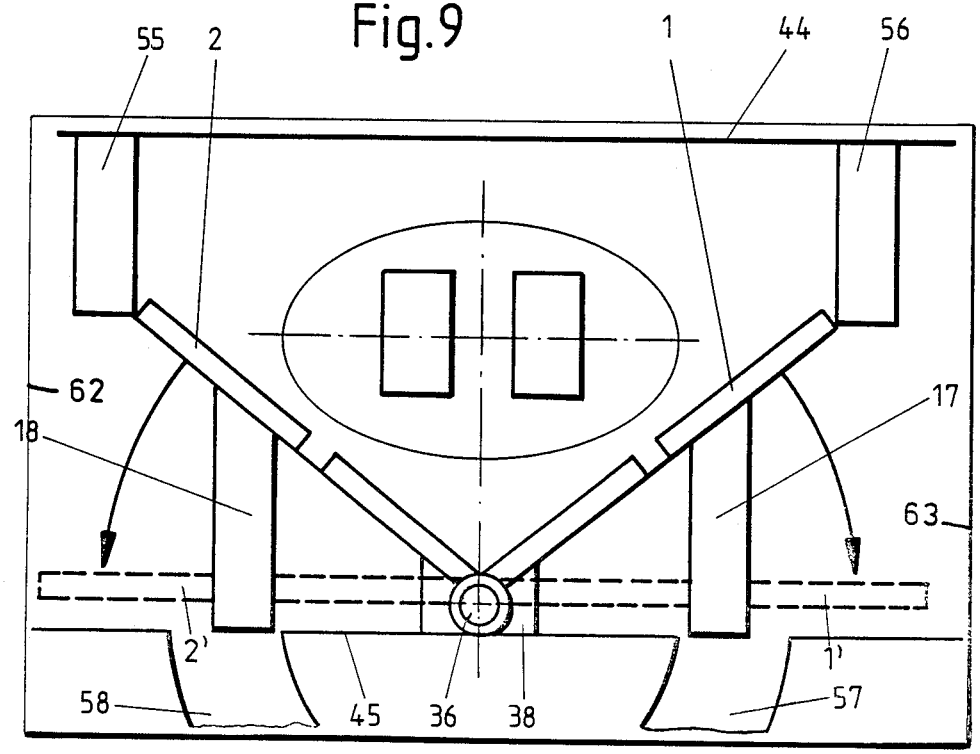

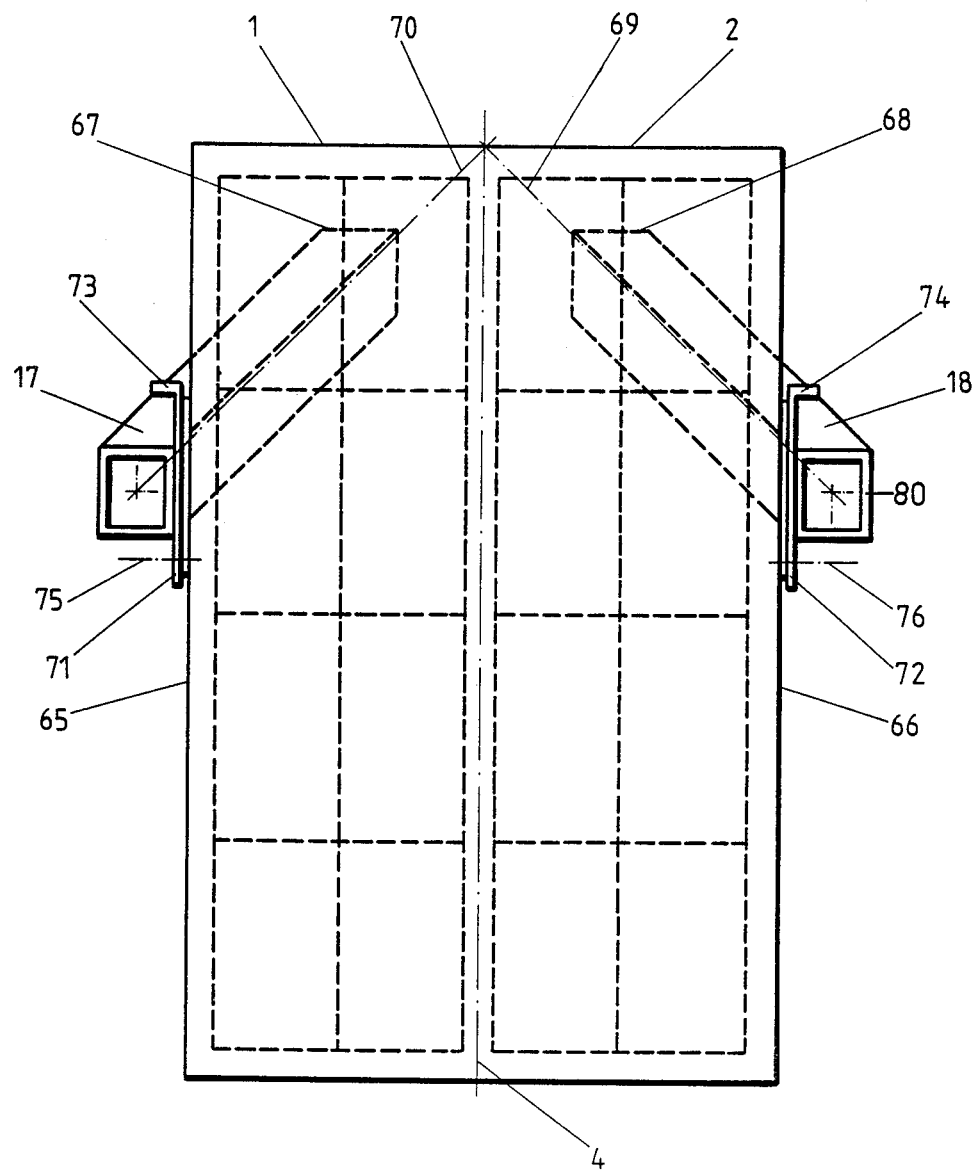

APPARATUS FOR CHECKING PERSONS FOR RADIOACTIVE CONTAMINATION

BACKGROUND OF THE INVENTION

1. Field of the Invention

This invention relates to apparatus for checking persons for radioactive contamination, comprising detector panels, which are optionally divided in height and extend at an angle to each other and define a room, which is adapted to be occupied by a person to be checked.

2. Description of the Prior Art

In such contamination check chambers, the front and rear sides of a person are sensed and it is difficult to ensure that the measurements are taken at equal distances. When the measurements are taken in two positions of the person, the distances will be small and the sensitivity will be high.

It is known to provide contamination check chambers having lateral entrance and exit doors, which are also provided with detectors. Such chambers may be provided on the floor with detectors in areas on which the feet are to be placed.

Known apparatus for monitoring passenger traffic comprise a check chamber provided with two doors which are so controlled that after one door has been opened the other door cannot be opened when a contamination has been detected.

In a known arrangement, at least three detector panels are arranged at an angle to each other in a top plan view. In such top plan view, two panels extend on opposite sides of a middle panel at an angle of an order of about 135°. Such a checking apparatus may be accommodated in a niche and may closely confine a person to be checked. But a disadvantage resides in that the measurements are taken at large distances at the corners formed between the outer detector panels, which extend at an angle to each other, and the middle detector panel. In said known arrangement the position of the person to be checked is not defined because there are only hand boxes for receiving the hands at the outer edges of the outer panels. Because the elbows may be bent at various angles, which may be large if the upper arms are retracted, and the arms may be bent at the elbow joints, the distances from different persons to be checked to the detector panels defining the niche will vary. The measurements taken on the front and rear sides of a person will not be consistent.

It is also known to provide counting boxes laterally of a chamber-defining wall and to use said boxes for a checking of the hands with photodetectors which permit an entrance of the hands into the boxes. The walls defining such chambers contain detectors, which are described as large-area counters and are separated only by a horizontal blank strip rather than by a vertical blank strip.

In the use of the known arrangements, the results of the measurements taken on the front and rear sides of a person are not consistent with each other and the fact that the arms can be bent to various degrees results in an undefined basic position of the person being checked.

It is an object of the invention to provide an apparatus which is of the kind described first hereinbefore and comprises panels extending at an angle to each other and fewer detectors and which permits more accurate results to be obtained with a simpler arrangement.

That object is obtained in accordance with the invention in that only two detector panels are provided, which extend at an angle to each other, and the detectors carried by each of said panels are separated from each other by a vertical blank strip, which is disposed in a central region of the width of the panel and with reference to the contour of a reference figure in a top plan view is so arranged that the signals generated from the detector means separated by the blank strip can be processed to compensate the influence of the closest approximation of the reference figure to the detector panels in said central region on the generation of said signals.

The two detector panels are provided on one side with detectors or radiation-sensitive detector fields and both detector panels are connected to each other to extend at an angle to each other which has an apex that defines a vertical axis. The two surfaces on which the detector panels are provided with detectors or detector fields face the angular space which is included by the detector panels. Adjacent detectors of each detector panel are separated by a vertical blank strip so that adjacent detectors or detector fields are horizontally spaced apart. With reference to the contour of a reference figure in a top plan view that blank strip is so arranged that said blank strip extends in the area in which the panel is closest to the contour of the reference figure. In the processing of the detector signals the differences between signals from the groups of detectors or detector fields separated by the blank strip will compensate the influence which is due to the approximation to the reference figure.

Such an apparatus requires fewer detectors and has a simpler arrangement than the known apparatus having a comparable measuring range. Because the number of detector panels is small, the gaps obtained in the horizontal measuring configuration will be smaller so that a more accurate result can be obtained with a simpler configuration. The proposed division of the detectors into groups also reduces the zero effect. An essential advantage resides in that the peak sensitivity obtained in the middle of the width of the detector is not disproportionally high in comparison to the sensitivity in the remaining regions so that a rather uniform sensitivity profile can be obtained with only two detector panels.

It will be particularly desirable so to arrange the two detector panels that their sensing surfaces include an angle between 90° and 118°. With an angle of that order of magnitude, the apparatus can well be adapted to various reference figures. In a desirable embodiment, the sensing surfaces of the two detector panels include an angle between 96 and 112 degrees.

In an optimum embodiment, the apparatus is designed for an elliptical reference figure having in a top plan view a major axis of 35 cm and a girth of 95 cm (ICRP) and comprises two detector panels having sensing surfaces which include an angle of an order of 104°.

From the explanations given hereinbefore it is apparent that the arrangement in accordance with the invention is selected in consideration of the reference figure and, in particular, the angle and the exact location of the vertical blank strip of each detector panel, which blank strip is particularly disposed in the central region of the width of the panel, must be selected in dependence on the reference figure so that the blank strip which separates adjacent detectors from each other is disposed as closely as possible to the area in which the sensing surface most closely approximates the person to be checked.

In a desirable embodiment the vertical blank strip is arranged in a central region of the width of the detector panel.

If two detector panels extending at an angle to each other are provided each with a planar sensing surface, the angular arrangement in consideration of the reference figure is a special feature and the division of the detectors into two functional groups, which are horizontally spaced apart in the central region of the width of the panel, is of special significance.

Whereas the reference figure is a datum, said datum may be different in different geographic regions so that an adaptation will be desirable.

To permit a complete check of a person, a tread surface provided with a foot detector structure including two detector units for respective feet is arranged in the area defined by the panels. Such a divided detector structure having two units, which form a tread surface, will determine the position to be assumed by the person to be checked.

In a preferred embodiment of the invention, each detector panel is provided on each side of the vertical blank strip with a plurality of vertically spaced apart detectors and an underarm box is provided near the outer edge of detectors mounted on the detector panel and is disposed on a selected level above the tread surface.

In the preferred embodiment described above, each underarm box comprises at least one surface-type detector, which extends over the average length of an underarm and of a hand and at an angle to the plane that is defined by the detectors on the detector panel. In a desirable embodiment, each underarm box includes at least two surface-type detectors.

The longitudinal axis of each underarm box is upwardly inclined relative to the horizontal from an entrance opening of the underarm box to the opposite end of the underarm box.

The provision of such underarm boxes is a particularly desirable feature of this invention. It has already been known to provide hand boxes, which contain short receiving chambers having substantially the length of a hand. Said hand boxes were disposed outside of detector panels of a detecting apparatus and receive the hands of a person to be checked. In that case a person who has inserted his or her hands into the hand boxes can still move his or her wrist, elbow and shoulder joints connecting the hands to the trunk of the person so that the position of the person will not be defined.

Because the hands as well as the underarms are required to be inserted into underarm boxes, the position of a person being checked cannot be changed by a movement that is permitted by the wrist joints. Because the underarms and the hands are constrained to extend in a predetermined direction, any contamination of the underarms can be detected much more reliably and the remaining joints of the arm will substantially be constrained to assume a predetermined position. As a result, a person to be checked will be constrained to assume a position which permits a more reliable check.

This will also be the case when the person to be checked has turned around and his or her underarms no longer extend in the underarm boxes. Such person has previously been compelled to assume a predetermined position by the special arrangement and direction of the underarm boxes and when such person has turned around while standing on the foot detector structure such person will tend to more or less remain in the position assumed by him or her before turning around.

The upward inclination of the underarm boxes will facilitate the insertion of the underarms into the boxes. If two detectors are provided in each underarm box, the transverse axes of such detectors are suitably horizontally arranged.

For a checking of persons differing in height, each person is caused to spontaneously assume a position which is suitable for a check. In embodiments which have been described hereinbefore, this will be accomplished in a particularly desirable manner if the longitudinal center line of each underarm box is upwardly inclined at an angle of about 30° from the entrance opening of an underarm box and said entrance opening is spaced about 130 cm above a tread surface provided with the foot detector. In such an arrangement, persons having a height between 150 and 200 cm can be caused to assume an optimum position and can be optimally checked.

The underarm boxes suitably have a length of about 50 cm. They may extend substantially parallel to each other in a top plan view. In a preferred embodiment, the center lines of the underarm boxes and/or the longitudinal axes of the detectors in the underarm boxes are upwardly inclined from the entrance opening of the underarm box as far as to the opposite end thereof and said detectors converge toward their opposite ends.

In a special embodiment, each underarm box comprises three elongate detectors, which constitute a triangular array in a cross-sectional plane which is normal to a longitudinal axis of the underarm box.

In all embodiments, the adequate insertion of the underarms into the underarm boxes can be checked by suitable sensors. It has surprisingly been found that in such case the constraint of the underarms will cause the person being checked to spontaneously assume a predetermined position, which substantially agrees with the optimum position. A particularly desirable result will be obtained with simple, economical means in the embodiment comprising only two detector panels, which extend at an angle to each other.

It has been explained hereinbefore that in desirable embodiments of the invention the location of the central vertical blank strip can be adjusted in consideration of the figure of the person to be checked. An embodiment which is preferred in this respect is so designed that the angle included by the two detector panels having a vertical blank strip substantially in the central region of their width can be adjusted in dependence on the configuration of a reference figure and for this purpose the two detector panels are interconnected by a hinge.

To permit an adjustment of the angles and elevations and for an adaptation to different reference figures, adjusting means are suitably provided at outer edges of the detector panels. In that case the underarm boxes are provided at said outer edges and the adjusting means can be used to adjust the elevation of each underarm box and the angle between the underarm box and the plane which is defined by the detectors of the detector panel.

The angles between each underarm box and the associated detector panel may be adjusted in dependence on the angle which is included by the two detector panels. It has been explained hereinbefore that the selection of that angle is important for certain measurements. In another desirable embodiment the detector panels extending at an angle to each other constitute a rigid unit, which is angularly movable about a vertical axis, and a resetting drive is provided, which is centered on said axis and is adapted to store resetting energy. In one embodiment, that angle can be intentionally changed or a change of that angle is permitted. In another embodiment, set screws are provided for at least temporarily holding the two detector panels in a position in which they extend at a selected angle to each other. For a temporary adaptation, the two panels may be interconnected by ratchet mechanisms, which limit the adjustment, and resetting means may be provided. Such an arrangement will permit an adaptation to different reference figures. Detent or locking means may be provided, which may be mechanical or may be electromechanical and provided with adjusting magnets and such mechanism may be provided with adjusting drive means so that an adaptation to a person to be checked can be affected within predetermined limits.

The above remarks are applicable to embodiments in which the two detector panels are angularly movable toward each other to a predetermined minimum angle as well as to embodiments in which the panels extending at an angle to each other are angularly movable in unison. A plurality of detector panels extending at an angle to each other and preferably arranged in pairs and provided each with detectors on opposite sides may constitute the wings of a revolving door, which is adapted to be locked in position and to be released by suitable means in an arrangement in which the detectors provided on the panels are electrically connected to signal-processing means.

Such revolving door can be walked through by a large number of persons in succession more quickly than has been possible before. In such an arrangement the wings of the revolving door, particularly the detector panels which constitute the wings of such revolving door, are rigidly interconnected.

BRIEF DESCRIPTION OF THE DRAWING

FIG. 1 is a top plan view showing an apparatus which comprises detector panels on which the detectors are separated by a vertical blank strip arranged in consideration of a reference figure.

FIG. 2 is an elevation which is similar to FIG. 1 and shows an embodiment which is additionally provided with underarm boxes.

FIG. 3 is a sectional view taken on line III—III of FIG. 2.

FIG. 4 is an elevation showing a detector panel as illustrated in FIG. 1 or 2 and viewed in the direction of the arrow IV—IV in FIG. 1 and illustrates also the arrangement of the underarm boxes.

FIG. 6 is a top plan view showing a check chamber in accordance with the basic concept of the invention.

FIG. 7 is a top plan view which is similar to FIG. 6 and shows a modification.

FIG. 8 is a top plan view showing a further embodiment of a check chamber in accordance with the invention.

FIG. 9 is a top plan view showing a check chamber in a modification of FIG. 8.

FIG. 10 is a front elevation showing two interconnected detector panels, which extend at an angle to each other and are provided with underarm boxes.

DETAILED DESCRIPTION OF THE PREFERRED EMBODIMENTS

Figure 5:
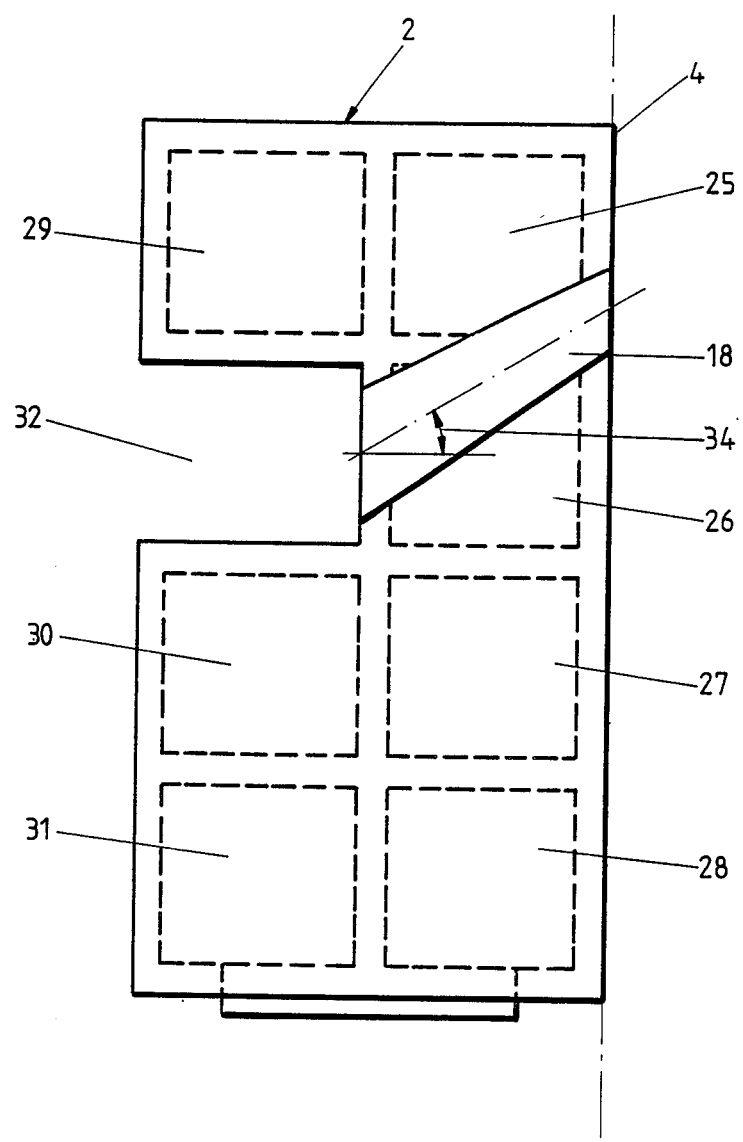
FIG. 5 is a side elevation showing the apparatus of FIG. 2 and illustrates the orientation of the underarm boxes.

The invention will now be explained with reference to illustrative embodiments shown on the diagrammatic drawing.

In all figures of the drawing, like parts are designated with the same reference characters.

In the embodiments shown in top plan views in FIGS. 1 and 2, two detector panels 1, 2 are mounted on a floor surface or floor plate 3. The two detector panels 1, 2 are interconnected at 4 and extend at an angle 5 to each other, the value of which is of high significance in connection with the design of the detector panels. In the preferred embodiment, that angle amounts to 104° but the angle may be varied throughout the range defined hereinbefore. That angle is selected in consideration of a reference FIG. 6, which has an elliptical contour in a top plan view. It is apparent that the ellipse has peripheral portions 7, 8, which are closest to the detector panels 1, 2. Adjacent to the portions 7, 8 of the ellipse, the detector panels 1, 2 have vertical blank strips 9, 10 so that the sensitivity of the detector panels is reduced in that region and the result which is obtained by the measurement will agree with the actual conditions as closely as possible, i.e., it will be uniform and will have no surperfluous minima. The blank strip is desirably disposed in the central region of the width of each detector panel. This arrangement will also determine the extent of said blank strip relative to the reference figure because the blank strip is disposed close to that portion of the reference figure which is closest to the detector panel.

The two detector panels 1, 2 are interconnected at 4 by conventional means. For instance, each panel comprises a carrying plate 77, or 78, which carries the detectors, which constitute radiation-sensitive surfaces or detector fields 13 to 16 (FIG. 2). The carrying plates 77, 78 may be integrally connected or may be welded to each other at 4 or may be interconnected by a hinge, which comprises interfitting sleeves and a rod extending through the sleeves. The blank strip 9 or 10 ensures that adjacent detector fields are spaced apart.

The design adopted in consideration of the reference figure is so selected that the flat radiation-sensitive surfaces or detector fields 13, 14 or 15, 16 provided on the inside surfaces of the detector panels 1, 2 face each other on opposite sides of the angle 5.

In such an apparatus, a person stands with his or her feet on a foot detector structure, which may be divided into two detector units 11, 12. The foot detector structure constitutes a tread surface and its two detector units 11, 12 define the positions of respective feet.

Each of the two detector panels 1, 2 is provided in its upper portion with an underarm box 17 or 18. The underarm boxes 17, 18 are parallel to each other and are so disposed relative to the blank strips 9, 10 that each underarm box 17 or 18 is close to that edge of the radiation-sensitive surface 13 or 14 of the inner detector 19 or 20 which adjoins the vertical blank strip 9 or 10.

It is apparent from FIG. 3 that each underarm box 17 or 18 is provided at its top and bottom with respective elongate, surface-type detectors 21, 22, which have a length corresponding to the total length of an underarm and of an extended hand. Said surface-type detectors converge toward those ends thereof which are remote from the associated panel 1 or 2. Adjacent to said remote ends of the surface-type detectors, the underarm boxes are provided with sensing means, such as proximity detectors 23 or photoelectric detectors 24, for a check whether the underarms have been introduced to an adequate depth.

The proximity detectors 23 are mounted in a frame 79, which is secured to the remote ends of the surface-type detectors 21, 22. The elements which constitute a photodetector 24 may also be mounted on that frame.

The structure of a detector panel 2 is apparent from the internal view shown in FIG. 4. The vertical blank strip 10 extends from top to bottom between the detector fields 25 to 28 and the detector fields 29 to 31. The detector panel has also horizontal blank strips, which separate the detectors or detector fields 25 to 31 from each other. Said rectangular surface-type detectors preferably have a vertical major axis. It is apparent from FIG. 4 that adjacent to the vertical joint 4 connecting the detector panel 2 to the other detector panel the detector panel 2 is provided with a vertical row of four vertically spaced apart detectors 25 to 28. On that side of the vertical blank strip 10 which is opposite to the joint 4 the detector panel 2 is provided with detector fields 29, 30 and 21, which are disposed adjacent to and parallel to the detector fields 25, 27 and 28, respectively. As a result, a blank area 32 beside the detector or detector field 26 is provided on the outside of the blank strip 10. An underarm box 18 is arranged in that blank area 32. In this region the body of the reference figure is not fully covered by the detectors. Owing to the provision of the underarm boxes, which extend at a distance from the center line 33, the introduction of the underarms into said boxes will result in such a constraint that optimum results will be obtained by the measurement.

The underarm boxes are connected to the carrying plates 77, 78 of the detector panels by means of a frame 80, which surrounds the surface-type detectors 21, 22. The arrangement of the detectors on the detector panel determines a certain elevation of the underarm boxes above the tread surface of the foot detector structure. That elevation may be selected as desired and will mainly be selected in consideration of an assumed height of the reference figure.

FIG. 5 is an external elevation showing the checking apparatus of FIG. 1, particularly the detector panel 2. Optimum results will be obtained by the measurement if the underarm boxes 17, 18 include an angle of an order of 30° with the horizontal, although that angle may also be of a different order of magnitude. But it has been found that the provision of underarm boxes 17, 18 with such spacing from each other and with such upward inclination toward the hand end of the boxes will ensure that persons of oridinary height will assume an optimum position.

That optimum design will facilitate the introduction of the underarms so that changes from the desired position owing to a movement of the wrist joints will be prevented; such deviations may occur in known apparatus. In conjunction with the provision of only two detector panels, each of which has a vertical blank strip in the middle of its width, the described arrangement of the underarm boxes will facilitate the introduction of the underarms into the underarm boxes, and will cause the person to virtually spontaneously assume the desired position on the foot detector units 11, 12.

Regarding the arrangement and orientation of the underarm boxes 17, 18, these are only diagrammatically shown in FIG. 4 and in practice will be inclined and diverge from the detector panels. The underarm boxes are preferably secured to the detector panels 1, 2 to form a rigid unit therewith.

The drawing shows an advantageous embodiment of the underarm boxes, each of which may be provided with more than two surface-type detectors.

The term "rigid unit" also includes a unit comprising a pedestal, which carries the floor plate 3. In such "rigid unit" the two detector panels 1, 2 may extend at an angle to each other at least in condition for the measurement or at the time of measurement. The two detector panels may be pivotally movable in unison or may be interconnected by a hinge.

As described hereinbefore, such hinge may comprise alternate interfitting sleeves mounted on the carrying plates 77, 78 and a rod extending through the interfitting and aligned sleeves. Detent means may be provided for holding the detector panels in a selected position relative to each other.

Embodiments comprising hinge rods 35, 36 are shown in FIGS. 6, 7 and 9.

Detector panels 1, 2 which are hingedly interconnected are provided with hinge rods 35, 36, on which the detector panels are mounted and may be rotatably mounted by means of hinge sleeves. Each detector panel 1 or 2 may be connected to the hinge rods 35, 36 by bearings and/or by ratchet mechanisms 37, 38 permitting a movement only in one sense and, if desired, by a resetting mechanism, which may be similar to an automatic door closer. In a preferred embodiment the ratchet mechanisms comprise a resetting drive, which is adapted to store resetting energy. Attention in this regard is also directed to FIGS. 11 and 12.

Such ratchet mechanisms 37, 38 are vertically spaced apart along the height or axial length of the hinge rods 35, 36. The axis of the hinge rods 35, 36 obviously coincides with the apex of the angle at the joint 4.

The ratchet mechanisms may consist of commercially available mechanisms provided with resetting piston-cylinder units.

In the embodiment shown in FIGS. 6 and 7, the assembly including the two detector panels 1, 2 is disposed between walls 39, 40 and 41 of a corridor or a check chamber of an assembly which has boundary walls 62, 63 on a baseplate. The wall 39 is straight and continuous and the wall 40 has an arcuate portion 41, which permits a pivotal movement of the detector panel 2, which constitutes a wing of a revolving door.

In FIG. 6 the shutter consisting of a revolving door is shown with the two detector panels 1, 2 in an initial position relative to the center line of the foot detector units 11, 12, which are parallel to the center line of the check chamber. In that embodiment the detector panels 1, 2 are pivotally movable in the direction of the arrow 42 to such a position that a person who has been checked and has stepped back from the two detector units 11, 12 can proceed along the wall 39.

FIG. 7 illustrates a modification, in which the assembly comprising the detector panels 1, 2 is initially in a position in which said assembly is asymmetrical relative to the corridor extending in the direction of the arrow 43 so that the two detector units 11', 12' for receiving the feet extend at an oblique angle to the walking direction indicated by the arrow 43. In embodiments in which the detector panels are initially asymmetrical with respect to the corridor, the detector panel 59 may be pivotally moved to the position 59', i.e., as far as to the wall 39, so that the corridor will be closed also in that position and the person can more easily leave the check chamber after the check.

In that embodiment, the wall 39 is provided with arcuate niches 60, 61, which permit a pivotal movement of the underarm boxes 17, 18 and may be provided with optional sealing means, not shown.

FIG. 8 shows a walk-through chamber defined by parallel walls 44, 45. A vertical hinge rod 46 is mounted on the wall 45 and is incorporated in a hinge for connecting two detector panels 1, 2, which are provided with vertical blank strips 9, 10, respectively.

The vertical hinge rod 46 is provided with a housing for a controlling ratchet mechanism 47. That ratchet mechanism effects a mutual check or adjustment to ensure that the two detector panels 1, 2 can be pivotally moved only in alternation rather than simultaneously in the directions of the arrows 48, 49, respectively, to positions 50, 51 in which they open a passage. That interdependence may be ensured by a computer or by an opposing ratchet mechanism having a driving or releasing element which is controlled by means for interpreting the results of the measurement.

Two alternatives may be selected for the embodiment shown. In the illustrated embodiment, the two underarm boxes 17, 18 are secured to the wall 45, e.g., by means of brackets, which are mounted at the ends of the underarm boxes and are connected to the wall 45 by means of plugs. The underarm boxes 17, 18 may remain in their position owing to the blank area 32 shown in FIGS. 4 and 5. Nevertheless, a passage will be opened at least over one half of the spacing of the walls 44, 45 when a check has been completed or the next person is to be admitted.

That concept can particularly be adopted if vertical partitions 53, 54 are provided at the outer edges of the two detector panels 1, 2 and are movable to the positions 53' and 54' indicated by dotted lines. The partitions 53, 54 are secured to the carrying plates, e.g., by welding and preferably consist of plain walls although the partitions may also be provided with detector fields.

FIG. 9 shows an arrangement in which vertical walls 55, 56 are rigidly connected to the wall 44 and the outer vertical edges of the two vertical detector panels 1, 2 are pivotally movable past those side edges of the walls 55, 56 which are disposed near the center of the corridor. In that embodiment the underarm boxes 17, 18 are secured to the detector panels 1, 2 and the wall 45 is formed with preferably curved niches 57, 58 for receiving the two underarm boxes 17, 18 in alternation as one or the other of the two detector panels 1, 2 is pivotally moved about the rod 36 to the position designated 1' or 2', respectively.

In the embodiments shown in FIGS. 6 to 9, the ratchet mechanisms 37, 38 or the ratchet mechanism housing may be provided with means for effecting a release in an emergency. Such means may unlock the two detector panels 1 and 2 from the means holding said detector panels at a predetermined angle to each other so that the unlocked detector panels can be pivotally moved relative to each other to a position in which an emergency passage is opened between the walls of the check chamber. This may be accomplished with the aid of externally disposed control means, not shown, or by means of an emergency release lever 64 provided inside the check chamber, particularly between the detector panels 1, 2 when they are in their initial position (FIG. 8).

In the embodiments of the check chambers defined by the walls 39, 40 or 44, 45 and the walls 55, 56 attached thereto, the lateral boundary walls 62, 63 may be provided so that it is apparent that said embodiments preferably consist of self-contained assemblies which define a corridor. Such assemblies may be commercially available and can quickly be installed at a desired location. Such assemblies comprise the illustrated side walls, a floor and a ceiling as well as the detector panels 1 and 2 extending between the floor and the ceiling.

FIG. 10 is a front elevation showing two flat detector panels, which extend at an angle to each other and are provided with detector fields defined by dotted lines. The underarm boxes 17, 18 extend on the outside of the detector panels and are mounted at the outer edges 65, 66 thereof, e.g., on the carrying plates 77, 78 (FIGS. 1 and 2). The underarm boxes 17, 18 are connected to the carrying plates 77, 78 by adjusting means 71, 72, which are fixed to the carrying plates 77, 78 by fasteners 75, 76. Said fasteners may consist of screws so that the elevation of the underarm boxes 17, 18 can be altered if each carrying plate 77 or 78 has a plurality of vertically spaced apart holes for receiving such screw. The adjusting means 71, 72 permit also an adjustment of the inclination of the underarm boxes 17, 18. For this purpose, the adjusting means 71, 72 are provided with handles 73, 74. In accordance with FIG. 10 the underarm boxes 17, 18 are downwardly and inwardly inclined toward their inner ends 67, 68 so that the center lines 69, 70 of the underarm boxes 17, 18 intersect in a plane which bisects the angle 5 having the apex 4.

Only for the sake of clearness, the above-mentioned bearing means and ratchet mechanisms will now be explained also in conjunction with control means.

Figure 11:
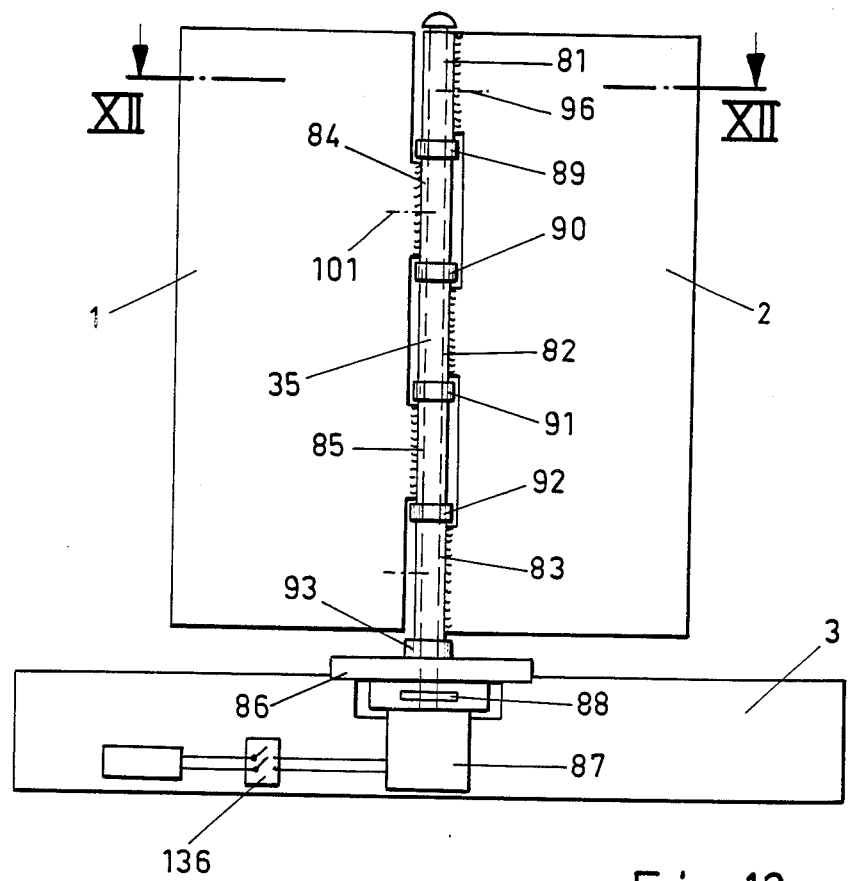
FIG. 11 is a front elevation showing an apparatus comprising two detector panels, mounting means for the detector panels, and drive means.

FIG. 11 shows how the two detector panels 1, 2 are pivoted on a hinge rod 35, which extends through the alternate interfitting sleeves 81 to 83 of the detector panel 2 and 84, 85 of the detector panel 1 and into a pedestal 86 mounted on the floor plate 3. A driving gearmotor 87 is mounted under the floor plate 3 and is coupled by coupling means 88 to the hinge rod 35. The motor 87 is connected to a power source by a switch 136, which is so designed in known manner that it can be actuated to determine for the motor 87 a desired sense of rotation or to reverse the rotation and to make and break the circuit. The motor 87 is adapted to rotate the hinge rod and to rotate the detector panels 1, 2 to a selected angular position relative to each other, in which the detector panels are locked by a detent mechanism such as is shown in FIG. 12.

Bearing rings 89 to 93 may be interposed between the sleeves 81 to 85.

Figure 12:
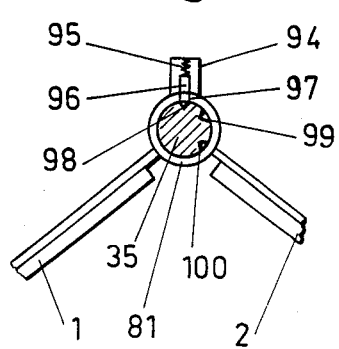
FIG. 12 is a sectional view taken on line XII—XII in FIG. 11.

FIG. 12 is a fragmentary sectional view taken on line XII—XII in FIG. 11. The hinge rod 35 and the sleeve 81 are apparent. The sleeve 81 is secured to the detector panel 2. A housing 94 is mounted on the sleeve 81 and contains a detent pin 96, which is biased by a spring 95 and extends through an opening 97 of the sleeve 81 and into a recess 98 formed in the hinge rod 85. That detent pin 96 can be retracted by hand so that it can be inserted into another detent recess 99 or 100 when the angular position of the detector panels relative to each other is to be altered. The detent recess may be so shallow that the detector panel 2 can be held in position relative to the hinge rod 35 but can be rotated about said rod 35 by a force which exceeds a threshold value that is determined by the detent mechanism and the spring 95. The detent pin 96 is only diagrammatically indicated in FIG. 11. At least one detent pin 101 is mounted on a sleeve 84 connected to the detector panel 1.

Because the detent mechanism can be disengaged, it constitutes a ratchet mechanism and the check chamber can be opened for an emergency.

Figure 13:
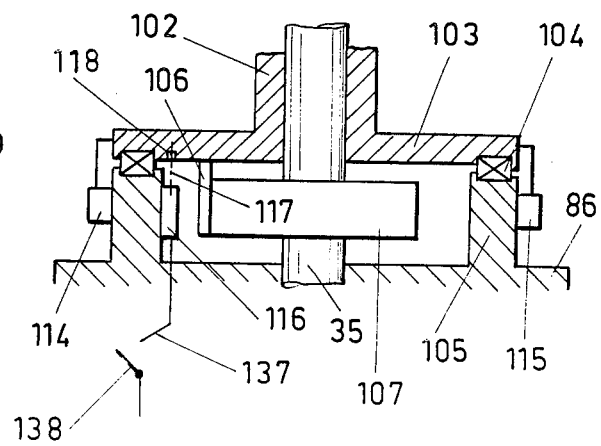
FIG. 13 is a fragmentary view showing the lower portion of an apparatus comprising two detector panels and a resetting drive.

FIG. 13 is a fragmentary view showing lower portions of the detector panels 1, 2, which in that embodiment are secured, e.g., to a common sleeve 102, which is rotatably mounted on the hinge rod 35. The sleeve 102 is provided at its lower end with a carrying flange 103, which is supported on a ring bearing 104, which is mounted on an upstanding cylindrical ring 105, which is mounted on the pedestal 86. A spiral spring 107 is disposed between an axial lug 106 depending from the sleeve 102 or from the carrying flange 103, on the one hand, and the hinge rod 35, which is fixed in the pedestal 86, on the other hand. That spiral spring 107 is strained as the detector panel assembly is rotated in one sense and is relaxed as it resets that assembly to its initial position. The end positions of said assembly are defined by stops 114, 115, which are disposed, e.g., between the carrying flange 103 and the cylindrical ring 105, and by at least one locking device, which consists, e.g., of an electromagnet provided with an armature 117, which is movable in response to an excitation of the electromagnet. When the detector panels are in one or the other of their end positions, said armature 117 can be moved into a recess 118 formed in the carrying flange, and the armature 117 can be moved out of the recess when the assembly is to be unlocked for a rotation.

The electromagnet is in conventional manner a separately excitable electromagnet comprising a coil and a diagrammatically indicated supply lead 137, which is connected by an excitation control switch 138 to a battery.

The switch 138 may be a two-pole switch.

The arrangement described just before constitutes a simple embodiment of a resetting drive provided with spring means and locking means.

Figure 14:
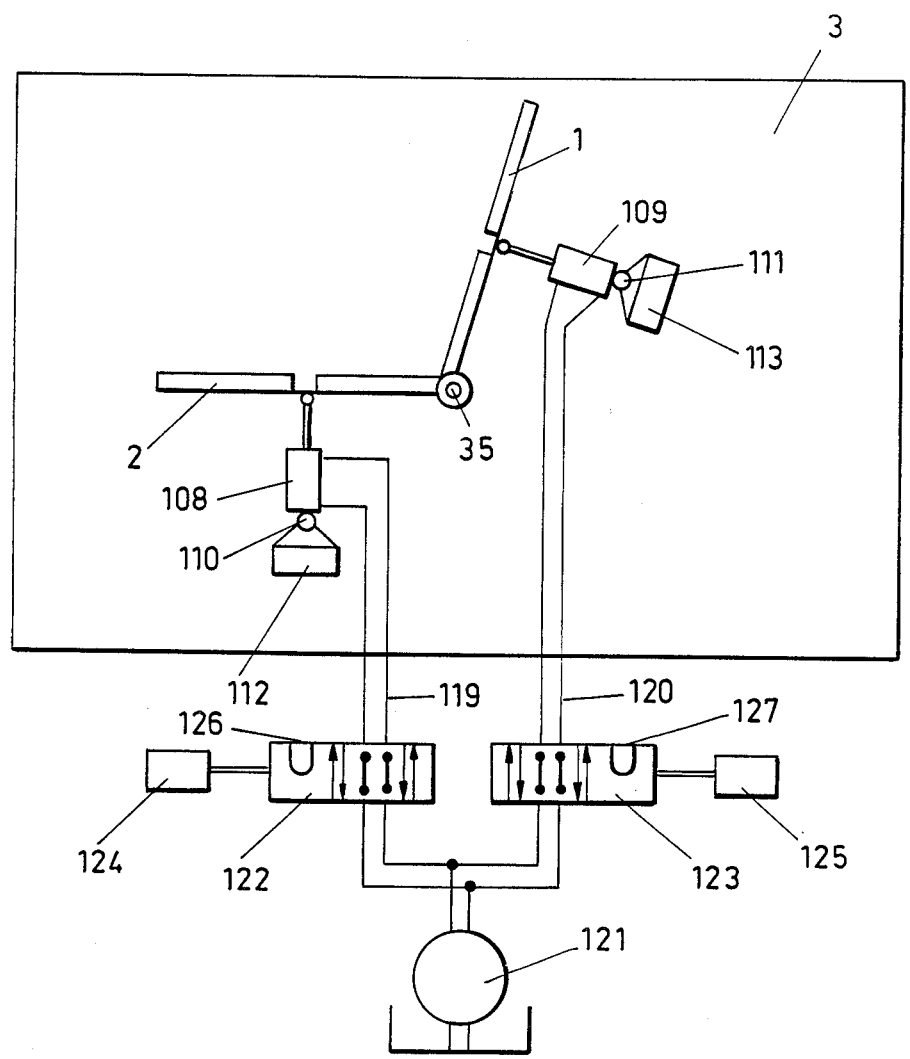
FIG. 14 is a fragmentary top plan view showing an apparatus comprising separate drive means for each detector panel.

Separate drive means for moving the detector panels 1, 2 are shown by way of example in FIG. 14. Each detector panel is individually movable about a hinge rod 35, on which the detector panel is mounted, e.g., by means of sleeves as shown in FIG. 11, and is hinged, e.g., at its lower end, to a drive 108 or 109, which is supported by hinges 110 or 111 to a bracket 112 or 113 mounted on the baseplate 3. Said drive means may consist of electromagnets having an extensible or retractable armature or may alternatively consist of hydraulic drive means provided with a telescopic piston. When selective or interdependent adjustments of the detector panels are desired, the drive means 108 and/or 109 are energized or actuated. If hydraulic drive means are provided, they are connected in hydraulic circuits 119, 120, which include a hydraulic pump 121, which can be selectively connected to one or the other of the hydraulic circuits and is operable in a sense corresponding to the desired direction of movement of the detector panel.

The connection of the pump 121 to the hydraulic circuits 119, 120 is controlled by two known sliding valves 122, 123, which are actuated by actuating means 124, 125.

The means for driving the pump are not shown and are energized and deenergized, respectively, in response to a movement of the sliding valves 122, 123 to and from the positions for an operation of the detector panels in one sense or the other.

It is apparent that each sliding valve comprises grooves for a flow of the fluid in the various directions and is adjustable to a locking position and formed with a land 126 or 127 for disconnecting the hydraulic circuits 119, 120 so as to disable the drive means 108, 109, e.g., to permit the opening of an emergency exit.

Examples of detent or locking means, bearing means, ratchet mechanisms and resetting means have thus been described and shown.

Figure 15:
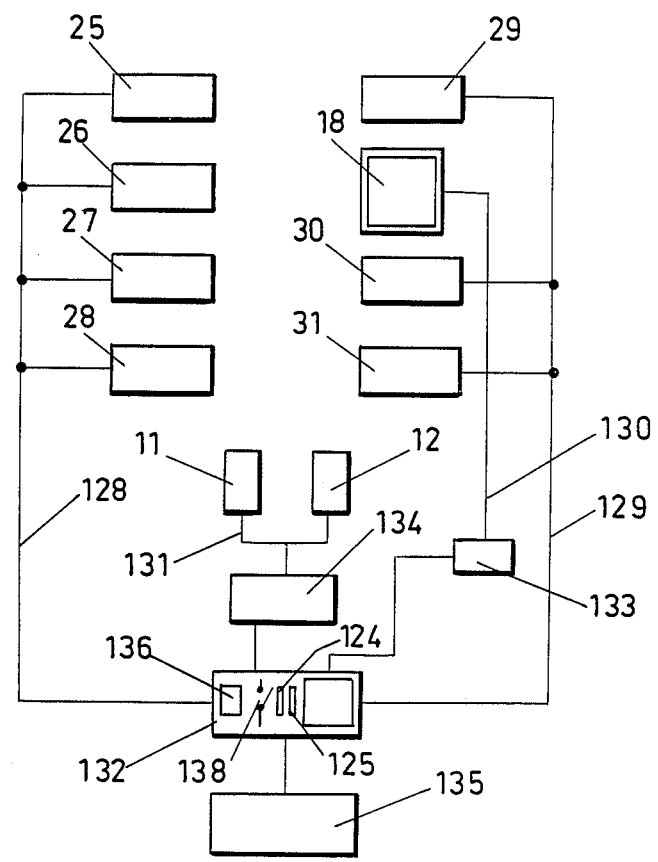
FIG. 15 is a block diagram.

FIG. 15 is a block diagram, from which the detector fields 25 to 31, the underarm box 18 (of FIG. 4) and the detector units 11, 12 of the foot detector structure of FIG. 1 are apparent. All detector fields or detectors are connected by lines 128, 129, 130 and 131 to a control subassembly 132. Each line 130 or 131 may incorporate monitoring and testing circuits 133, 134 for checking the operation of the connected detectors and for checking whether the underarms have been inserted to an adequate depth into each underarm box, such as 18.

The control subassembly 132 comprises also the control drives for controlling the drive means for effecting adjustments, the locking means, etc, such as are shown in FIGS. 11 to 14. Said control subassembly comprises a switch for turning on and off and reversing the gearmotor 87, the switch 138 controlling the excitation of the electromagnet 116, and switch means for the actuators 124, 125 for the sliding valves 122, 123 or for the circuits for exciting said actuators.

The control subassembly 132 is connected to a display 135 for indicating the results of the checks.

An example of a circuit arrangement for a different checking apparatus is shown in European Patent Application No. 0 060 574, from which the basic concept of the electric connections of the detector fields is apparent. In the apparatus in accordance with the invention, the circuitry includes also lines connected to the actuating means so that switching operations for initiating the operation of appropriate components of the apparatus will be performed in response to signals indicating predetermined values of certain parameters or input signals. Such signals may be generated in response to an actuation of limit switches or to the completion of the operation of timers.

We claim:

1. Apparatus for checking persons for radioactive contamination, comprising two detector panels (1, 2), which are provided each with detectors on one broadside, wherein said two detector panels (1, 2) extend at an angle to each other in such a manner that the apex of the angle defines a vertical axis and those broadsides of the detector panels which are provided with detectors face the space that is included by the detector panels, each detector panel has on said broadside provided with detectors a vertical blank strip (9, 10) between adjacent detectors, and said blank strip is so arranged with reference to the contour of a reference figure (6) such that signals generated by the detector means which are separated by the blank strip (9, 10) are processed to compensate the influence of the closest approximation of the reference figure to the detector panels on the generation of said signals.

2. Apparatus according to claim 1, wherein the angle included by those broadsides of the detector panels (1, 2) which are provided with detectors lies in the range from 90 to 118 degrees.

3. Apparatus according to claim 2, wherein the angle between the two detector panels lies in the range from 96 to 112 degrees.

4. Apparatus according to claim 3, wherein the detectors provided on each detector panel (1, 2) have radiation-sensitive surfaces lying in common planes and said common planes include an angle of an order of 104 degrees with each other.

5. Apparatus according to claim 1, wherein the vertical blank strip (9, 10) of each detector panel (1, 2) is disposed at the center of the width of the detector panel.

6. Apparatus according to claim 1, wherein a floor plate (3) forming a tread surface and provided with a foot detector structure having two detector units (11, 12) for respective feet is arranged in the space that is included by the two detector panels (1, 2).

7. Apparatus according to claim 6, wherein underarm boxes (17, 18) are mounted on the detector panels adjacent to the outer edges thereof at a selected elevation above the tread surface.

8. Apparatus according to claim 7, wherein the detectors provided on each detector panel (1, 2) have radiation-sensitive surfaces lying in a common plane and each underarm box (17, 18) comprises at least one surface-type detector, which extends over a distance corresponding to the average length of an underarm and a hand and includes an oblique angle with said plane.

9. Apparatus according to claim 7, wherein each underarm box comprises at least two surface-type detectors (21, 22).

10. Apparatus according to claim 8, wherein each underarm box (17, 18) has a longitudinal axis which is upwardly inclined from an entrance opening at one end of the box to the opposite end of the box.

11. Apparatus according to claim 7, wherein the detectors provided on each detector panel (1, 2) have radiation-sensitive surfaces lying in a common plane, each underarm box (17, 18) has at one end an entrance opening, which is spaced about 130 cm above the tread surface of the foot detector structure (11, 12) and each underarm box extends along a straight line and has a straight longitudinal center line, which includes an oblique angle with said plane and is upwardly inclined from said entrance opening at an angle of about 30° from the horizontal.

12. Apparatus according to claim 7, wherein each underarm box (17, 18) has at one end an entrance opening and comprises detector means which are upwardly inclined from said entrance opening and said detector means of said underarm boxes converge toward the opposite ends of said underarm boxes.

13. Apparatus according to claim 8, wherein the detectors provided on each detector panel (1, 2) have radiation-sensitive surfaces lying in a common plane, each detector panel (1, 2) is provided at its outer edge (65, 66) with adjusting means (71, 72), and said underarm boxes (17, 18) are connected to said detector panels (1, 2) by said adjusting means, which are operable to adjust the elevation of said underarm box and the angle between said underarm box and said plane.

* * * * *